G. WEISS.
MACHINE FOR OPENING EGGS AND SEPARATING THE CONTENTS THEREOF.
APPLICATION FILED MAY 19, 1919.
1,361,121.
Patented Dec. 7, 1920.
11 SHEETS—SHEET 4.
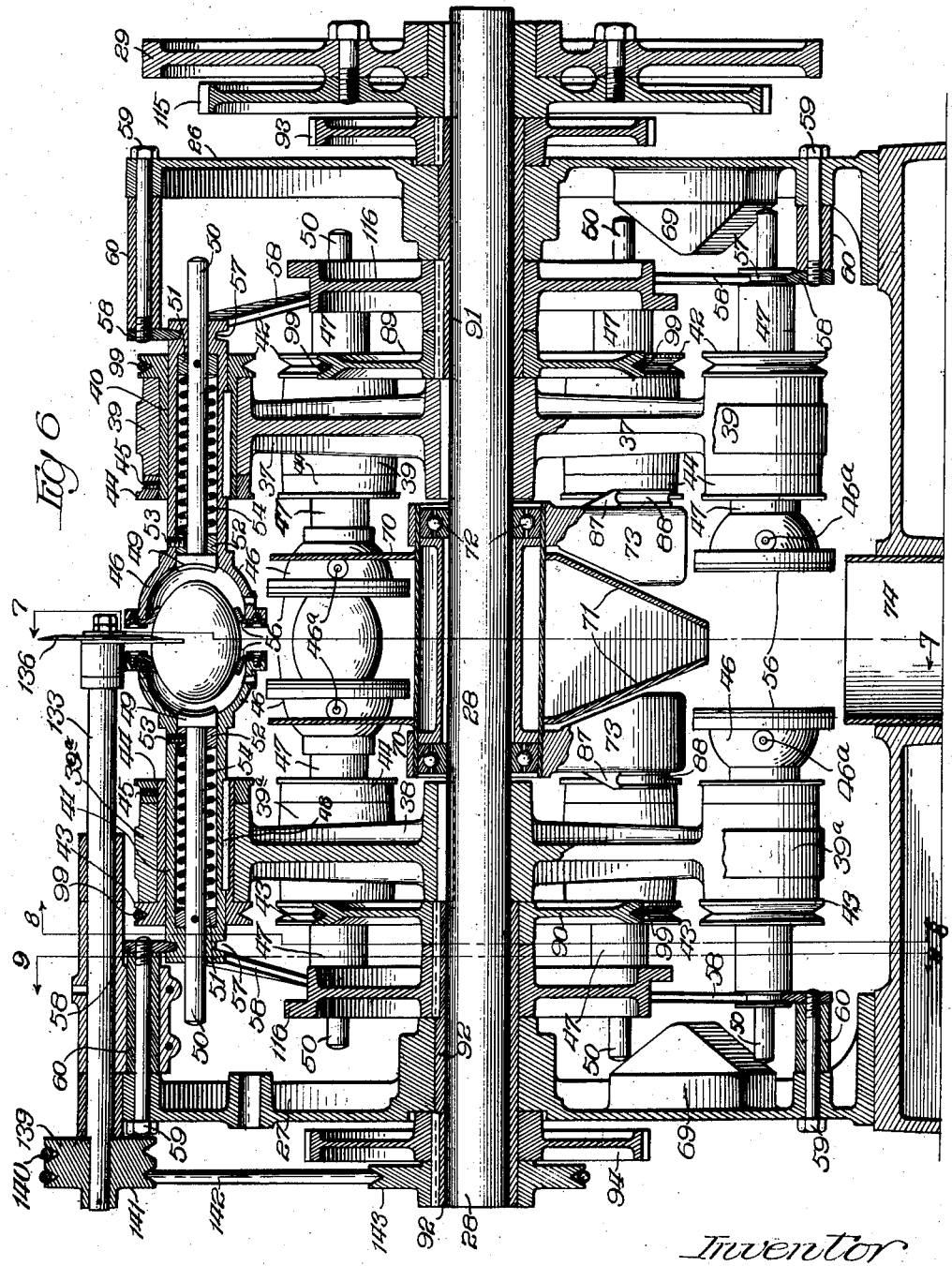

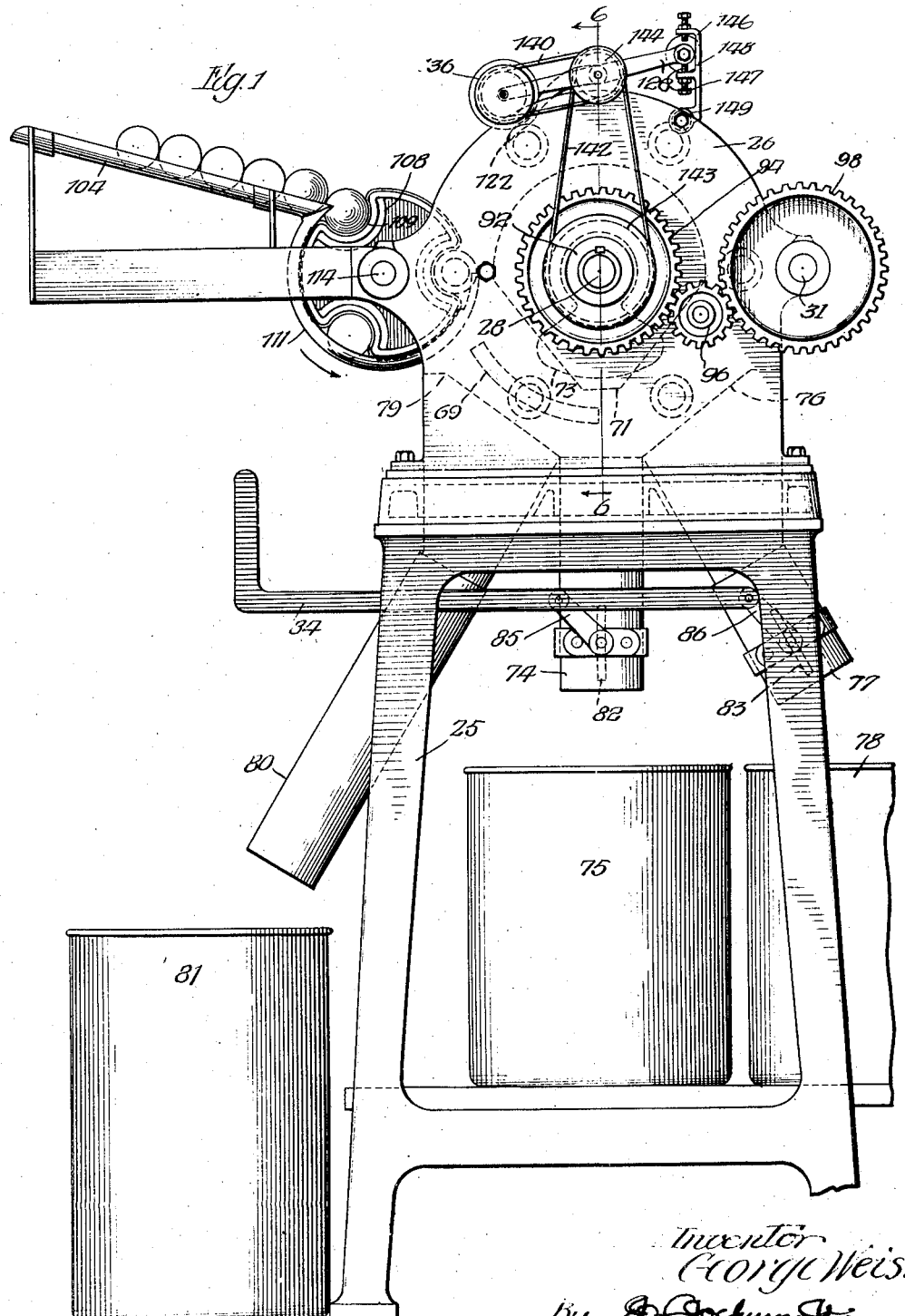

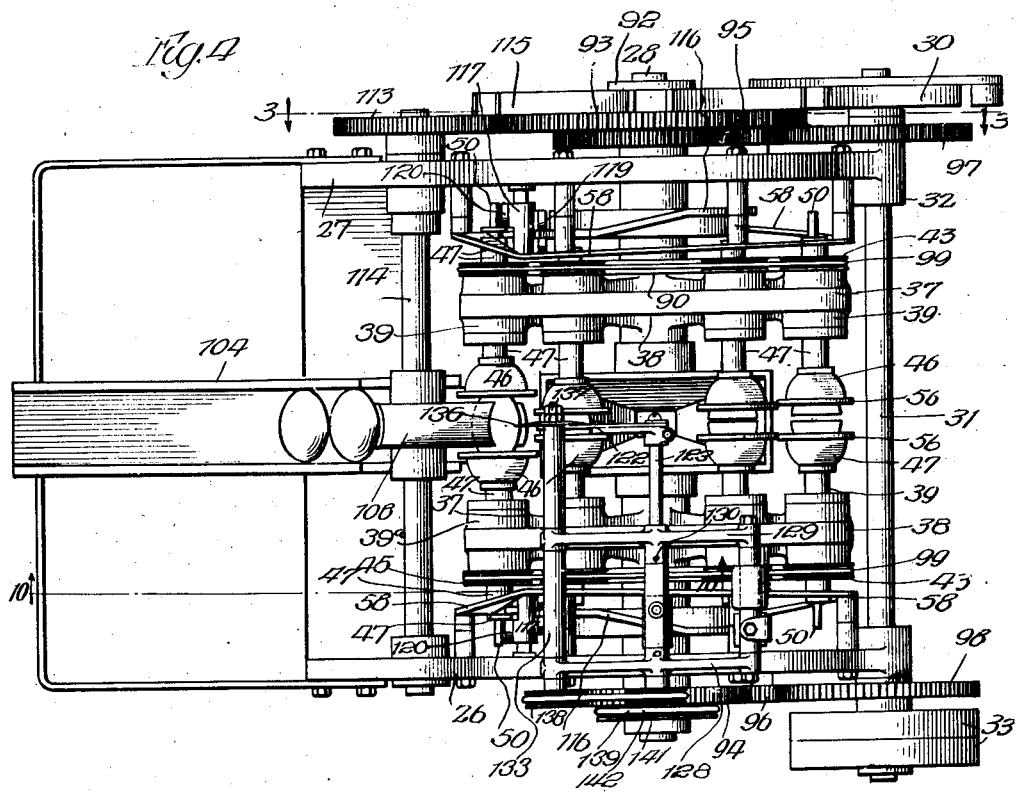
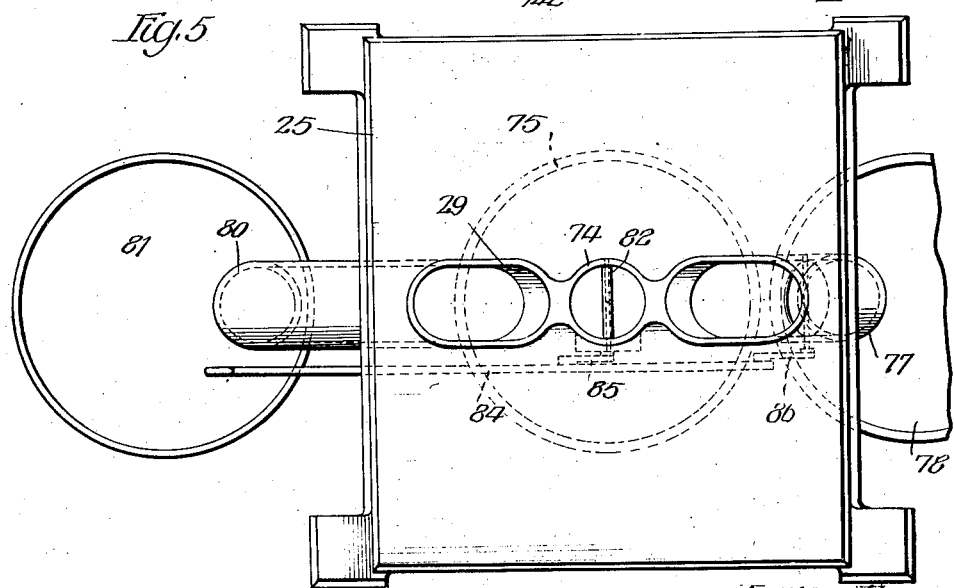

G. WEISS.
MACHINE FOR OPENING EGGS AND SEPARATING THE CONTENTS THEREOF.
APPLICATION FILED MAY 19, 1919.
1,361,121.
Patented Dec. 7, 1920.
11 SHEETS—SHEET 5.
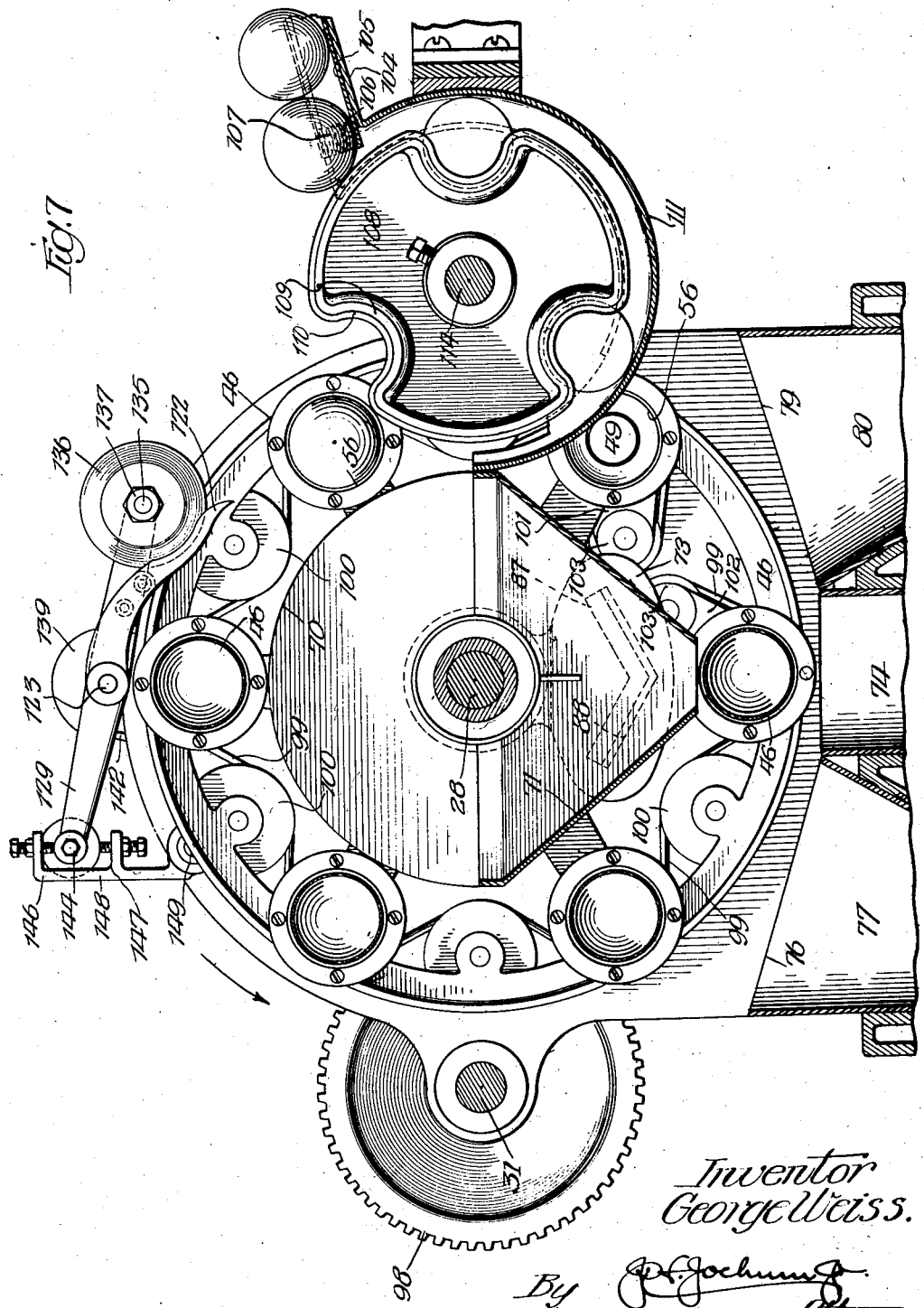
Inventor
George Weiss.
By G. WEISS.
MACHINE FOR OPENING EGGS AND SEPARATING THE CONTENTS THEREOF.
APPLICATION FILED MAY 19, 1919.
1,361,121.
Patented Dec. 7, 1920.
11 SHEETS—SHEET 6.
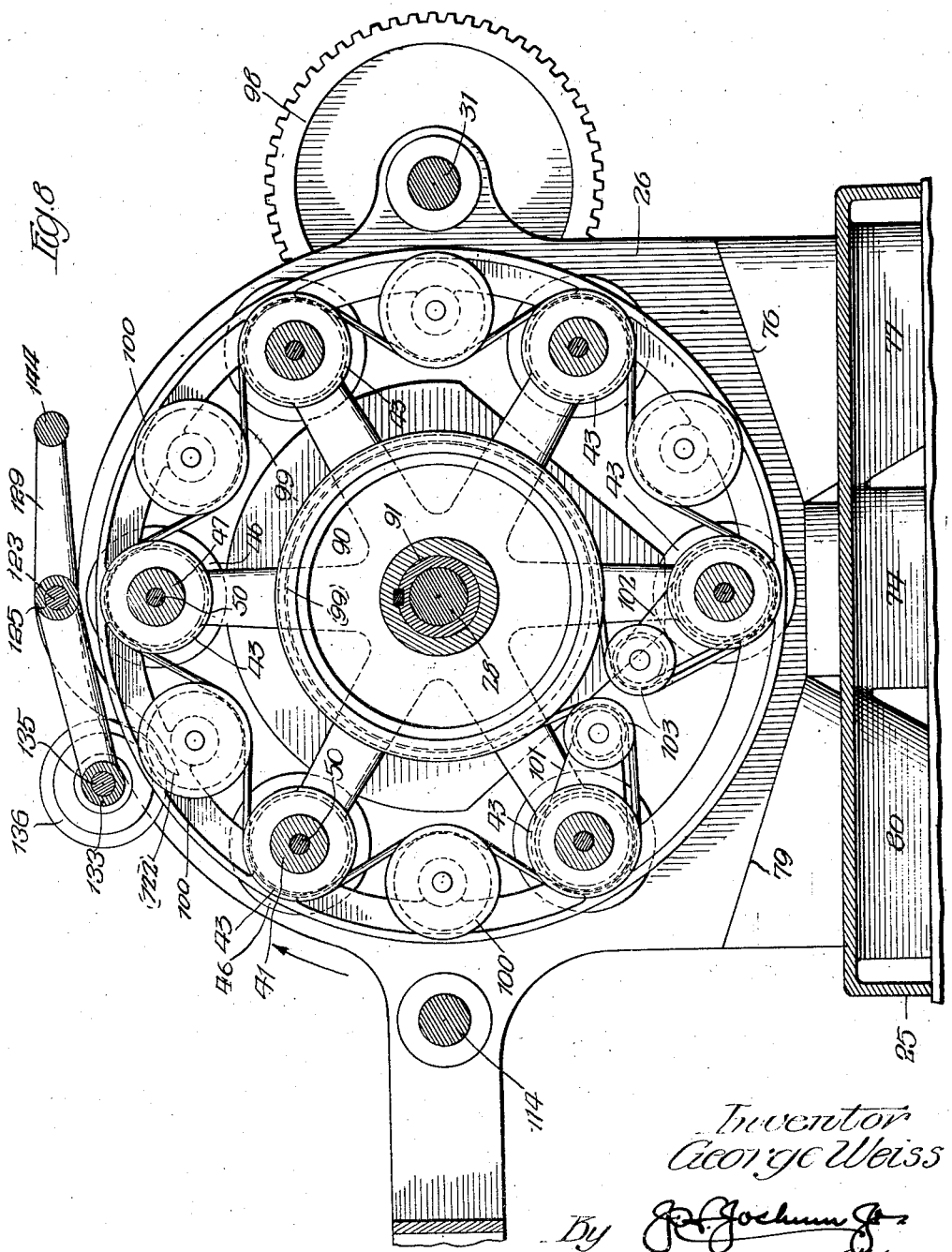

G. WEISS.
MACHINE FOR OPENING EGGS AND SEPARATING THE CONTENTS THEREOF.
APPLICATION FILED MAY 19, 1919.
1,361,121.
Patented Dec. 7, 1920.
11 SHEETS—SHEET 7.
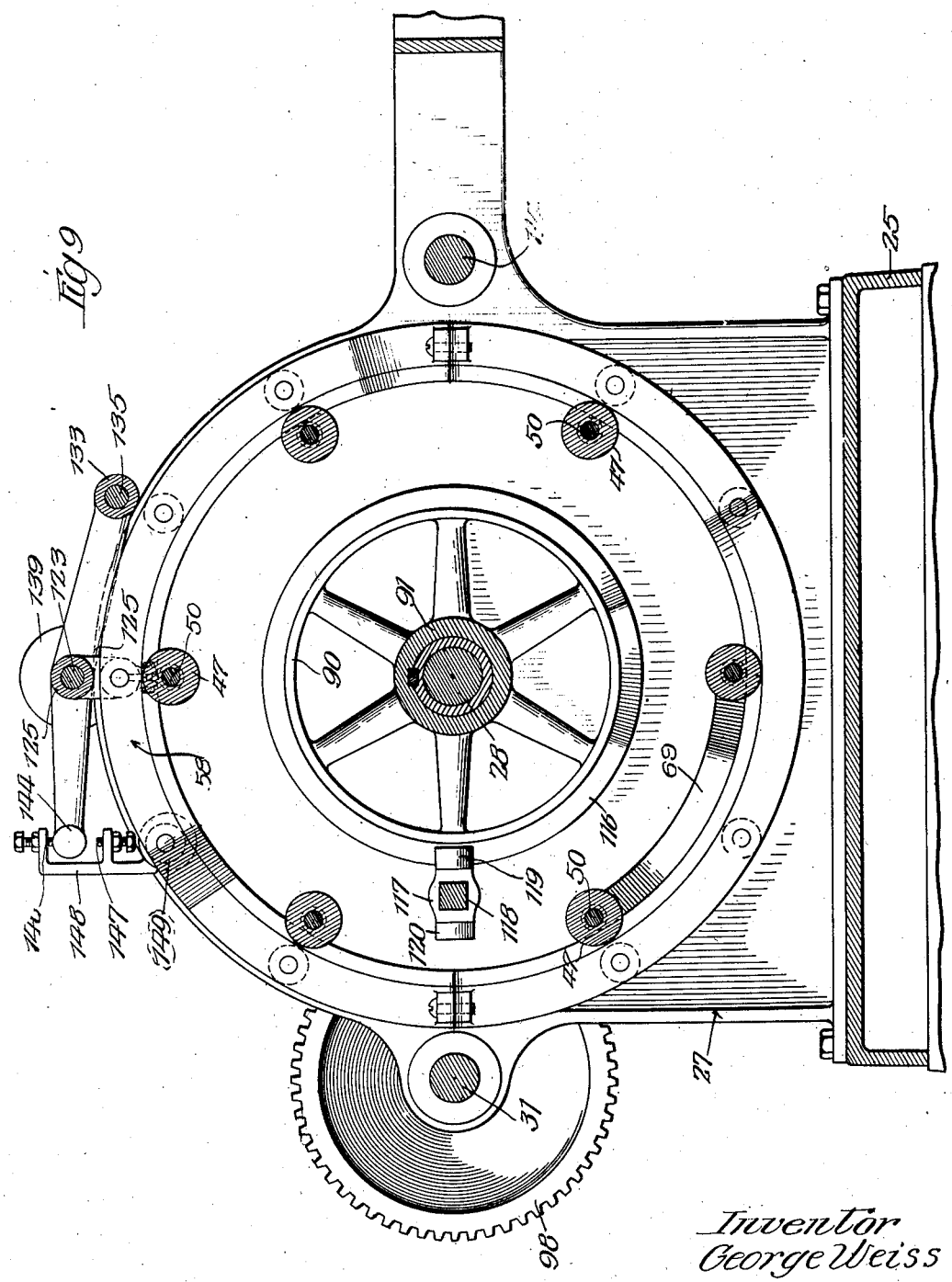
Inventor
George Weiss
By

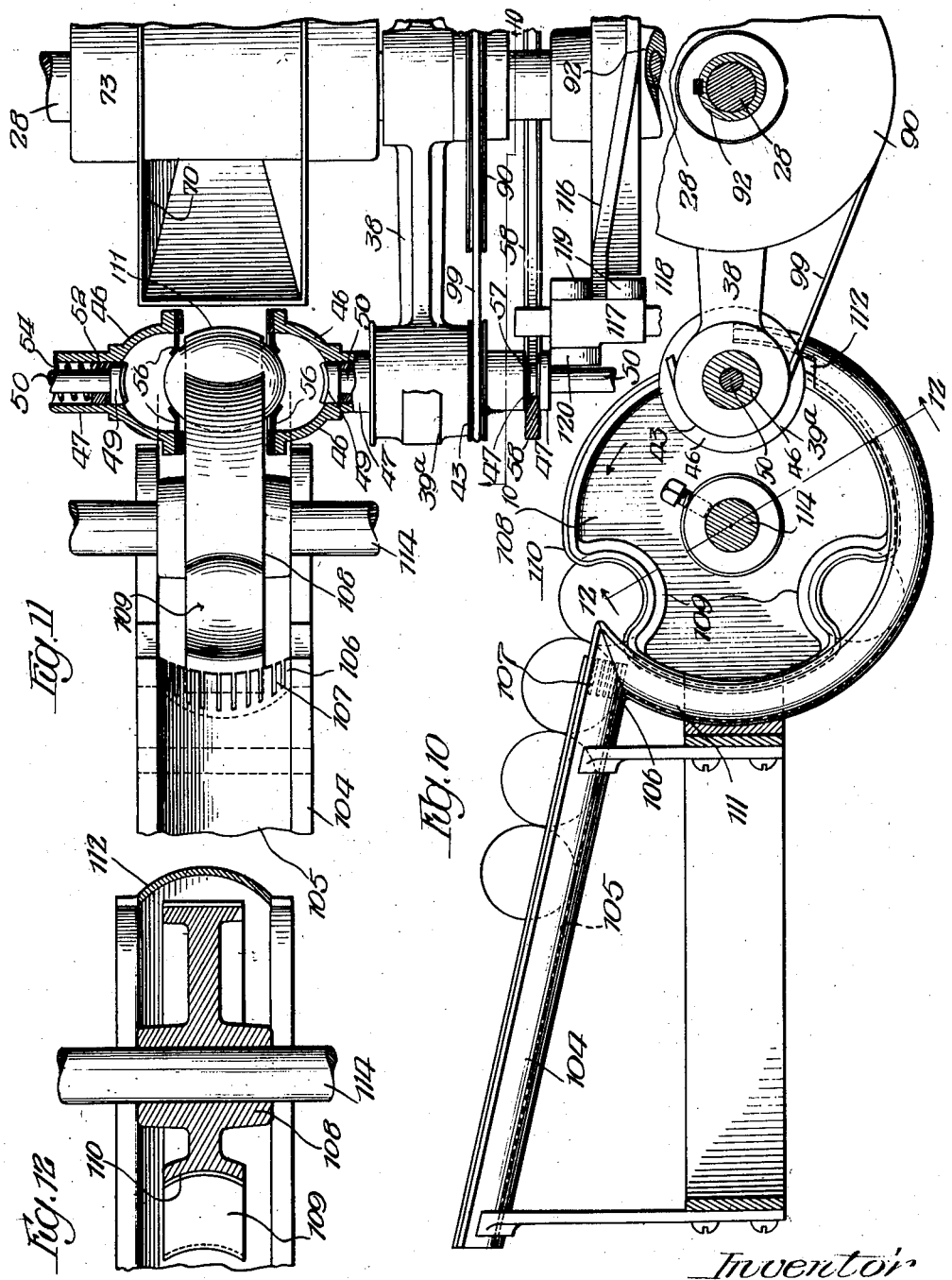

G. WEISS.
MACHINE FOR OPENING EGGS AND SEPARATING THE CONTENTS THEREOF.
APPLICATION FILED MAY 19, 1919.
1,361,121. Patented Dec. 7, 1920.
11 SHEETS—SHEET 9.
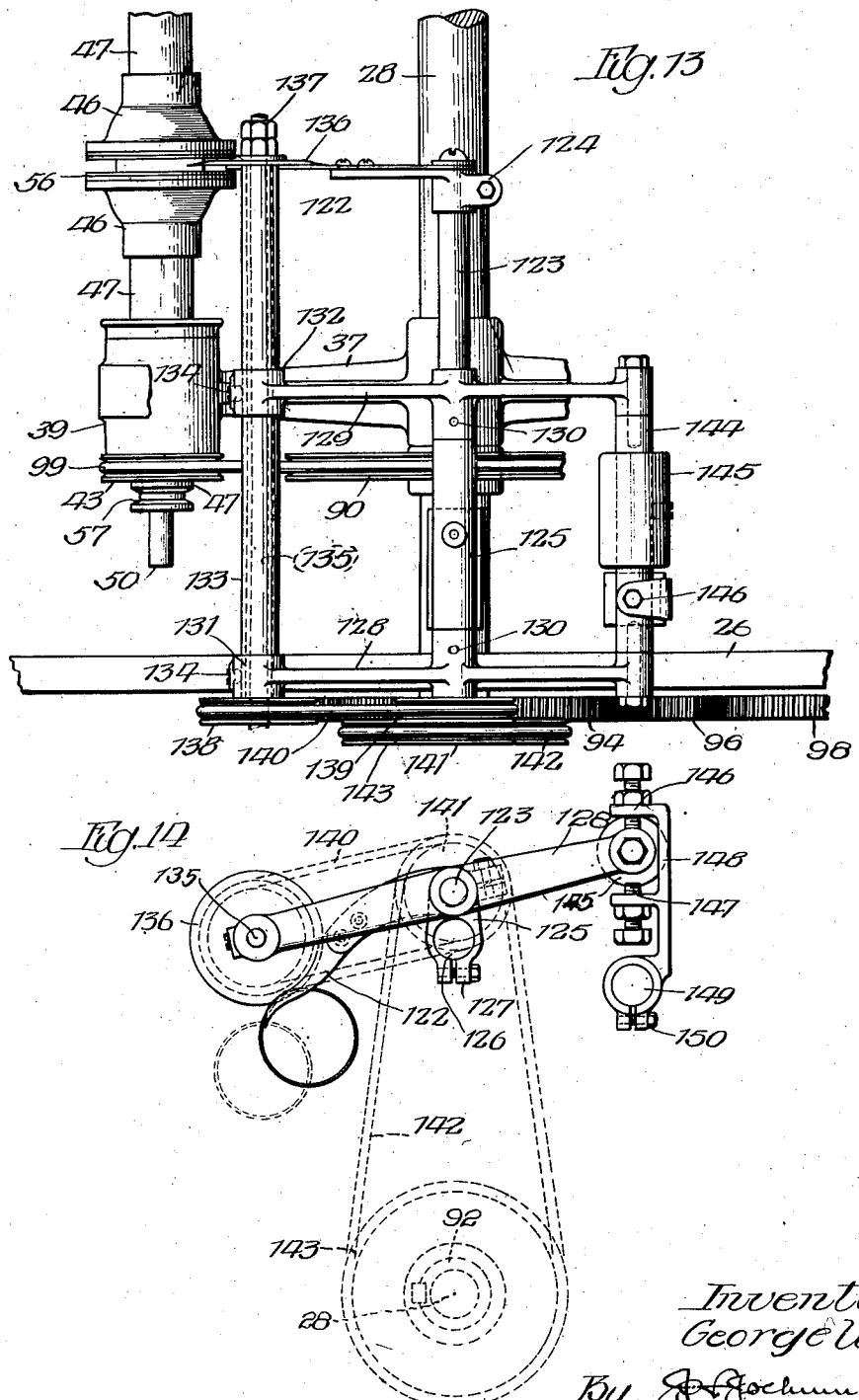

G. WEISS.
MACHINE FOR OPENING EGGS AND SEPARATING THE CONTENTS THEREOF.
APPLICATION FILED MAY 19, 1919.
1,361,121.
Patented Dec. 7, 1920.
11 SHEETS—SHEET 10.
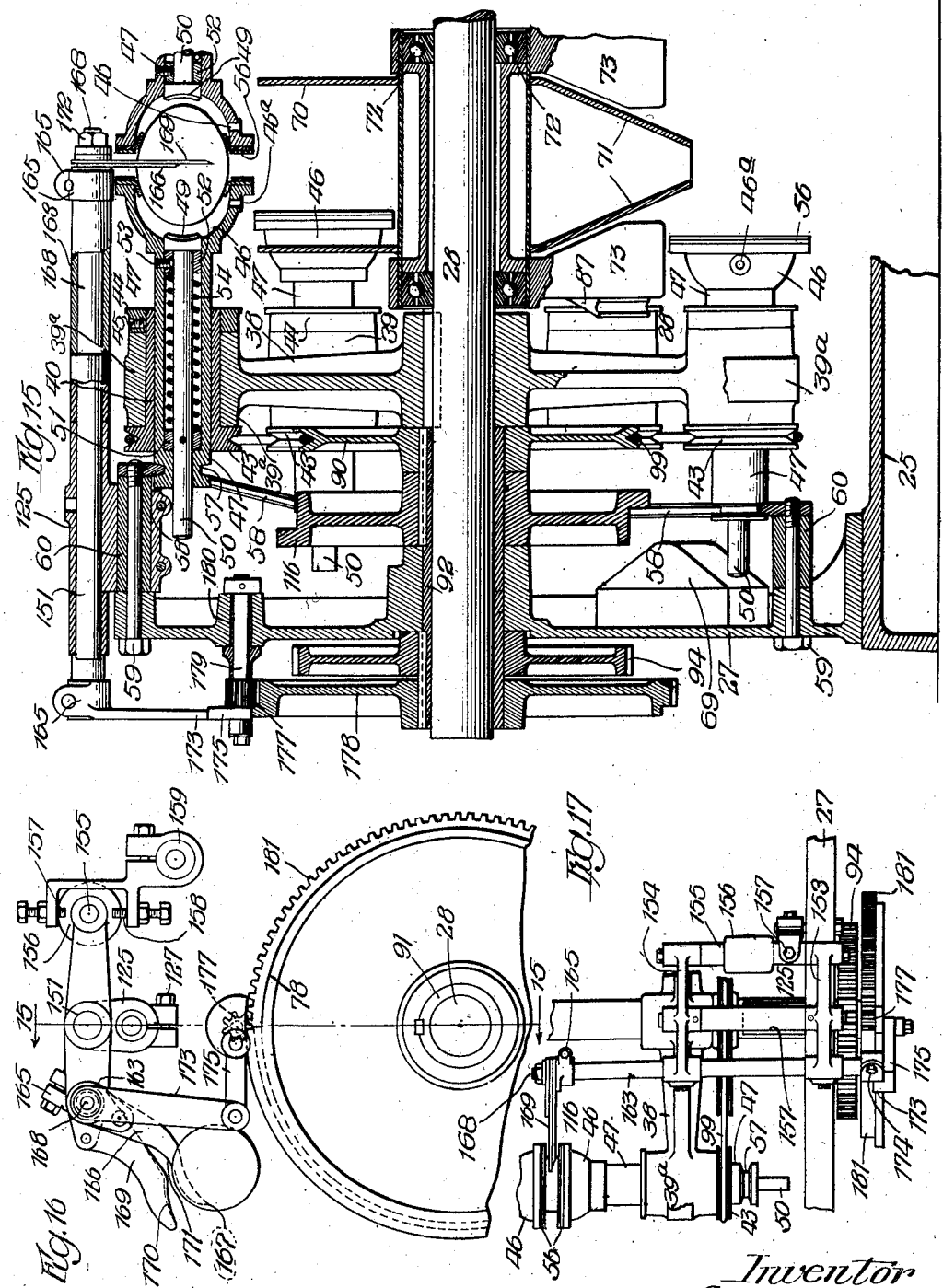
Inventor
George Weiss
By J. C. Jochum Jr.
Atty.

G. WEISS.
MACHINE FOR OPENING EGGS AND SEPARATING THE CONTENTS THEREOF.
APPLICATION FILED MAY 19, 1919.
1,361,121.  Patented Dec. 7, 1920.
11 SHEETS—SHEET 11.
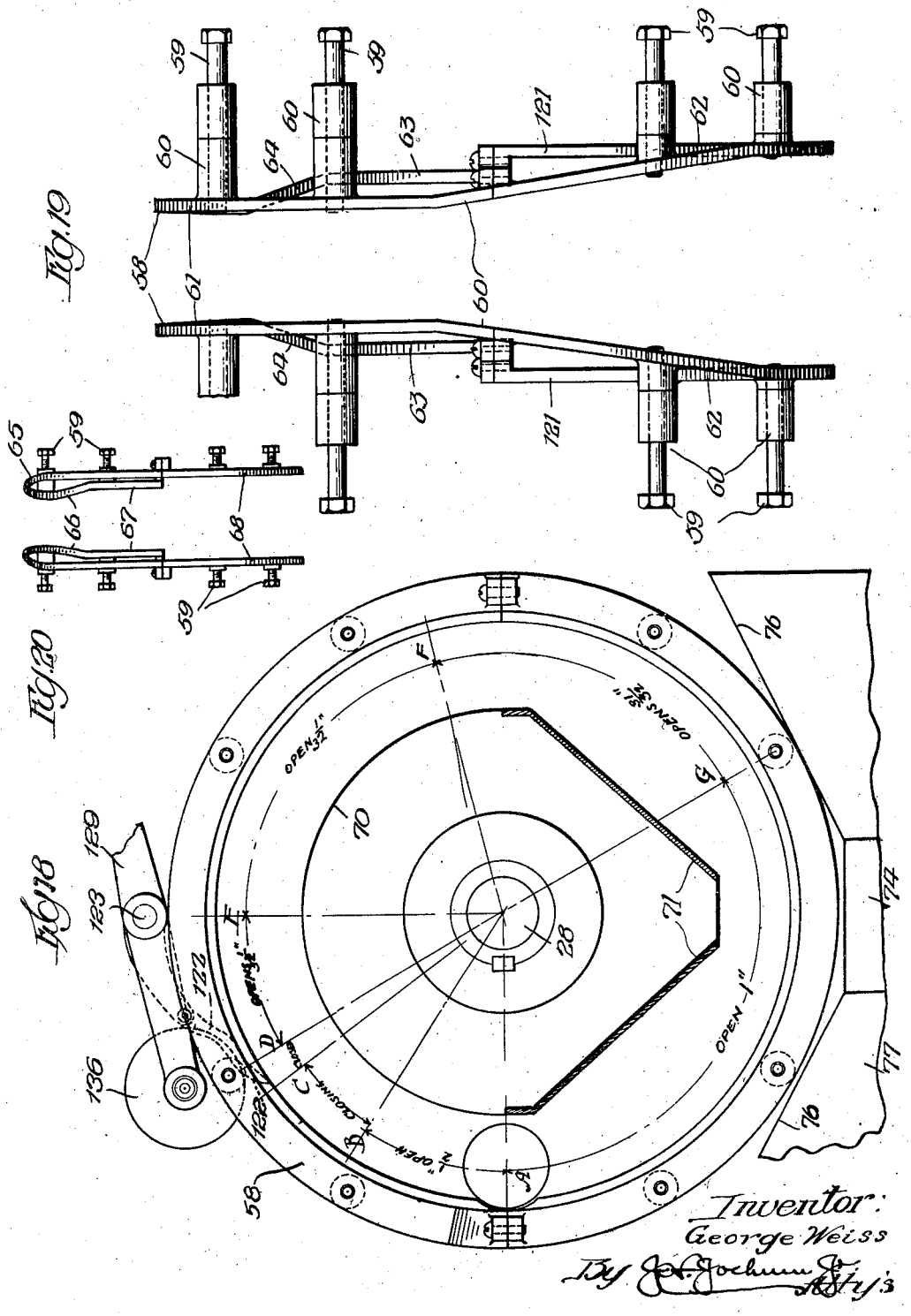

UNITED STATES PATENT OFFICE.

GEORGE WEISS, OF CHICAGO, ILLINOIS, ASSIGNOR OF ONE-HALF TO LESLIE P. MICK, OF EVANSTON, ILLINOIS.

MACHINE FOR OPENING EGGS AND SEPARATING THE CONTENTS THEREOF.

1,361,121.  Specification of Letters Patent.  Patented Dec. 7, 1920.

Application filed May 19, 1919. Serial No. 298,310.

*To all whom it may concern:*

Be it known that I, GEORGE WEISS, a citizen of the United States, residing at Chicago, in the county of Cook and State of Illinois, have invented certain new and useful Improvements in Machines for Opening Eggs and Separating the Contents Thereof, of which the following is a specification.

This invention relates to improvements in egg handling machines by means of which eggs may be automatically opened and the contents delivered therefrom, but more specifically the invention relates to improvements in machines for automatically opening eggs, and separating the contents thereof while they are being delivered from the shells and for delivering the contents and shells separately from the machine.

A further object is to provide an improved machine of this character which will be comparatively simple in construction, compact, automatic, effective and efficient in operation.

To the attainment of these ends and the accomplishment of other new and useful objects as will appear, the invention consists in the features of novelty in substantially the construction, combination and arrangement of the several parts hereinafter more fully described and claimed and shown in the accompanying drawings illustrating this invention and in which:

Figure 1 is a side elevation as taken from the right hand side of a machine of this character constructed in accordance with the principles of this invention.

Fig. 2 is a view similar to Fig. 1 with parts omitted and as taken from the left hand side of the machine.

Fig. 3 is a view as taken on line 3—3, Fig. 4.

Fig. 4 is a top plan view of the parts shown in Fig. 1.

Fig. 5 is a top plan view of the supporting frame and delivery chutes with the egg handling mechanism and supports therefor removed.

Fig. 6 is a vertical sectional view taken on line 6—6, Fig. 1.

Fig. 7 is a vertical sectional view taken on line 7—7, Fig. 6.

Fig. 8 is a sectional view taken on line 8—8, Fig. 6.

Fig. 9 is a sectional view taken on line 9—9, Fig. 6.

Fig. 10 is a detail sectional view as taken on line 10—10, Fig. 4.

Fig. 11 is a top plan view of the parts shown in Fig. 10.

Fig. 12 is a detail sectional view taken on line 12—12, Fig. 10.

Fig. 13 is a top plan view of one form of cutter for opening the eggs.

Fig. 14 is a side elevation of the parts shown in Fig. 13.

Fig. 15 is a detail vertical sectional view similar to Fig. 6 showing another form of cutter or egg opener and as taken on line 15—15, Fig. 16.

Fig. 16 is a detail left hand end elevation of the parts shown in Fig. 15.

Fig. 17 is a top plan view of the parts shown in Fig. 16.

Fig. 18 is a diagrammatic view showing the different steps and degrees of opening of the egg shell.

Fig. 19 is a diagrammatic view of the cams for imparting different degress of opening to the egg shell to separate the contents of the egg.

Fig. 20 is a diagrammatic view of a cam for opening the shell to discharge the albumen and yolk together.

Referring more particularly to the drawings and in the present exemplification of this invention, the mechanism is mounted upon a suitable supporting frame 25 which may be of any suitable size and construction and mounted upon the frame are uprights or members 26—27 between which the egg handling mechanism is arranged. Journaled in the members 26—27 to extend across the space therebetween is a shaft 28 which forms the main supporting shaft for the separating mechanism. This shaft preferably projects beyond the members 26—27, and is adapted to be given an intermittent rotation in any suitable manner but preferably by means of a Geneva element 29 which is secured to the shaft on one end thereof. Coöperating with this Geneva element 29 is a driving element 30 which is in turn connected with a shaft 31 mounted in suitable bearings 32 and on which shaft are driving pulleys 33 adapted to receive their motion from any suitable source, so that when the shaft 31 is rotated the carrier for the eggs will be given an intermittent forward movement.

The shaft 28 forms a support for the egg carrying mechanism, which latter preferably comprises laterally spaced members 37—38 which are secured to the shaft 28 for rotation therewith. These members are arranged between the members 26—27 and are laterally spaced therefrom. Carried by the members 37—38 are egg gripping and holding means, any number of which may be provided, and the coöperating parts of which gripping and holding means are carried by the respective members 37—38. As the construction and operation of these gripping and holding members is the same, the specific description and operation of one will apply equally as well to them all.

The members 37—38 are respectively provided with a plurality of bearings 39—39$^a$ in which are respectively journaled sleeves 40—41. Connected with one end of the respective sleeves are pulleys 42—43 which are preferably of a diameter somewhat larger than the sleeves and abut the ends of the respective bearings to hold the sleeves against longitudinal displacement. Securing collars 44 are connected with the other ends of the sleeves 40—41 and abut the other ends of the bearings. These collars 44 are secured to the sleeves by suitable fastening devices 45. Mounted in each of the sleeves 40—41 is a cup shaped member 46 which may be of any desired construction, that is, may be of a solid cup shape formation or may be constructed with a series of arms spaced from each other to form a cup. This cup shaped member is provided with a tubular stem 47 which extends into and is journaled in the sleeve 40 so as to be reciprocated therethrough. This stem 47 is connected with the sleeve so as to rotate therewith, by means of a suitable key or feather 48, but which latter permits the stem 47 to be reciprocated through the sleeve 40 in a manner to be hereinafter described. Supported by the egg holding element is an ejector for the shells and which ejector comprises a head or plunger 49 having a stem 50 extending through the stem 47 for any desired distance. Carried by the stem 50 is a shoulder 51 which is secured thereto and arranged within the stem 47 is a collar 52 through which the stem 50 passes. This collar 52 may be anchored against movement by means of a suitable fastening device 53. Surrounding the stem 50 between the collars 51—52 is a coiled spring 54 which acts upon the stem 50 to retract the plunger 49 and hold the same in an inoperative position with respect to the cup 46, but the plunger 49 is adapted to be moved against the tension of the elastic member 54 to eject the shell from the cup in a manner to be hereinafter set forth.

The coöperating cup shaped members 46 are arranged opposite each other in the respective members 37—38 and are adapted to be moved toward and away from each other in a manner to be hereinafter set forth.

Supported by each of the cup shaped members and extending across the open side therein is an annular flexible elastic member 56, the opening in which is of a diameter considerably smaller than the diameter of the cup to which it is secured and these flexible members on the coöperating cups are adapted to be deflected laterally into the respective cups when the end of an egg is inserted in the opening in the flexible member. This will cause the members to frictionally grip the egg shell so as to cause the shell to rotate and also serve to separate the parts of the shell in a manner to be hereinafter set forth. These flexible members may be detachably secured in position by suitable fastening means to permit their renewal or removal when desired.

Each of the sleeves 47 is provided with a groove or recess 57 adjacent one end thereof and in which groove operates a cam 58 supported in any suitable manner preferably by the members 26—27 to which the cams are secured by means of fastening devices or bolts 59, and interposed between the cam and the supporting frame are stools or spacing members 60, so that when the egg supporting drum-like structure is rotated by means of the shaft 28, it will be manifest that as the cams 28 extend into the recesses 57, the cup shaped members 46 will be moved longitudinally through the bearings 40—41 to cause the cup shaped members to be moved toward or away from each other, and this relative movement of the cup shaped members is controlled by the shape of the cam 58.

In the diagrammatic view Fig. 19, the cams 58 are shown and are so shaped that while portions 61 of the cam are traveling in the grooves 57 of the cup shaped members, the latter will be held in a position to grip or hold the egg and will remain in this position during the operation of cutting the shell. As the carrier is advanced until the portions 61 of the cam 58 move in the grooves 57, the cup shaped members will begin to separate, first slightly so as to separate the particles of the shell sufficiently to allow the albumen to be discharged from the shell. As the carrier is advanced still further, the cup shaped members will remain in this slightly separated position for a short distance and will then begin to separate to a greater extent to allow the yolk to be discharged. A further advancement of the carrier will cause the portions 62 of the cam to enter the grooves 57 and will separate the cup shaped members to a still greater extent, during which latter separating movement the egg shell is ejected from the holder by the plunger 49 in a manner to be set forth. During a still further movement of the carrier in the same direction the cup shaped members will remain in the full separated position with respect to each other.

The parts will remain in this same relative position until the cup shaped members arrive at the feeding point of the egg thereto. At this time another or secondary cam, to be hereinafter more fully described, is brought into operation to cause an initial movement of the cup shaped members toward each other to grip the egg only sufficiently to carry the egg away from the rotary element which delivers the egg thereto. After this initial movement of the cup shaped members by the said secondary cam, the cam 58 will again be brought into operation and the different steps of operation of the cup shaped members will be repeated.

Thus it will be seen that the cam is so constructed as to cause the proper movements of the cup shaped members to open and close at the proper times.

Should it be desired to simply open the egg shell and discharge the contents thereof, that is the albumen and yolk simultaneously without separating them, all that is necessary is to interchange the cams 58 with the cams 65 shown diagrammatically in Fig. 20. The portions 66 of the cams 65 when riding in the grooves 57 will start to separate the parts of the egg shell when cut, and when the portion 67 of the cam enters the grooves, the shell will be opened sufficiently to discharge both the yolk and albumen, the shell being held open by a portion 68 of the cam during the remaining portion of the revolution of the carrier and while the shell is being ejected by the ejectors 49. The ejectors or plungers 49, as before stated, are held normally retracted by the spring 54 and in order to operate the plunger 49 against the stress of the spring, cam devices 69 are arranged at the proper points in the rotation of the carrier and are supported in any suitable manner, preferably by the members 26—27. These cams 69 are so positioned and so constructed that after the contents of the shell have been completely discharged, the projecting extremity of the stem 50 of the plunger will engage the cams 69 and a further movement of the carrier will cause the stem 50 to be moved through the stem 47 of the cup shaped member, thus forcing the plunger 49 into engagement with the portion of the egg shell held in the cup to eject the shell. After the extremity of the stem 50 passes out of engagement with the cams 69, the spring 54 will retract the plunger.

The operation of the machine will be described in connection with the cam device diagrammatically illustrated in Fig. 19, that is, with a device adapted to successively separate the contents of the egg as they are being discharged from the shell.

When the shell is partly opened so as to permit the albumen to be delivered from the shell, and in order to catch the albumen and convey it through the machine, there is provided a hopper designated generally by the reference numeral 70. This hopper is provided with an open bottom 71 preferably tapered and is pivotally supported in any suitable manner between the elements 37—38. This may be accompanied by means of suitable ball bearings 72 so that the hopper will be maintained in a substantially vertical position to overcome any tendency to swing out of a position to catch the discharged contents from the shell, and which swinging movement might be imparted thereto by friction between the adjacent moving parts. This is preferably accomplished by means of suitable counterbalancing weights 73 in connection with the anti-friction ball bearings 72. The operation of the cam 58 is so timed that the cup shaped members will be entirely separated and the empty shells fully separated when the members reach a position directly beneath the discharge outlet 71 of the hopper so as not to be in the way of the discharge of the contents of the egg thereabove. From the hopper 71 the albumen will be discharged into a chute 74 to be conveyed into a suitable receptacle 75.

When the carrier is advanced sufficiently to open the shell to a greater extent, the yolk will be delivered from the shell and will be caught in a chute 76 having an outlet 77 discharging into a suitable receptacle 78. As the stems 50 of the cup shaped members engage the cams 69 during the advancement of the carrier, which will happen when the egg cup shaped members are wide open, the egg shells will be discharged and will be caught in a chute 79 having an outlet 80, discharging into a suitable receptacle 81.

Thus it will be seen that the various ingredients and particles of the egg will be separated and delivered from the machine separately.

It might sometimes happen that it is desired to prevent the contents of some eggs, which are not entirely fresh, from being delivered into the receptacles 75—78 and in order to provide for this contingency there may be provided in the outlets 74—77, cut off valves 82—83 (shown more particularly in Fig. 1) for closing the outlets. These valves are adapted to be simultaneously operated by means of an operating lever 84 arranged in a convenient position for the operator and is connected by means of cranks or arms 85—86 with the valves 82—83. Thus it will be seen that these valves may be controlled at will.

To prevent oil or lubricating matter which may be placed upon the shaft 28 or in the bearings 72 from dropping into the receptacle 75, there may be provided oil sheds 87 so arranged as to divert any oil that may drop, and these oil sheds may be provided with grooved lower faces 88 which will prevent the oil from creeping back upon the upper surface of the sheds.

During the operation of the cutting of the shell, in a manner to be set forth, the egg is rotated about its axis and such rotation also continues during the separation of the parts of the shell to discharge the contents therefrom. It is therefore necessary to impart a rotary motion to the egg and egg holders, that is the cup shaped members 46, with respect to the supporting members 37—38. This may be accomplished in any suitable manner but preferably by means of the pulleys 42—43 connected with the sleeves 40—41. To that end pulleys 89—90 are connected with sleeves 91—92 to rotate therewith and which sleeves have bearings upon the shaft 28 and are rotatable independently with respect to the shaft through the medium of gears 93—94 which are connected with the respective sleeves 91—92 to rotate therewith. The gears 93—94 mesh with idle gears 95—96 which latter in turn mesh with gears 97—98 connected with the shaft 31 to rotate therewith. Thus when the shaft 31 is rotated, it will be seen that the carrier for the eggs will be given an intermittent forward rotation through the medium of the shaft 28 and at the same time the sleeves 91—92 carrying the pulleys 89—90 will be given a continuous rotation. This continuous rotation of the pulleys 89—90 is communicated to the egg carriers through the medium of endless belts 99 which pass over the pulleys 89—90 and the respective pulleys 42—43. Idle pulleys 100 may also be provided intermediate the respective pulleys 42—43 over which the endless band 99 also passes. In order to maintain the band 99 sufficiently taut to drive the pulleys, belt tighteners may be provided of any suitable construction but preferably embody coöperating arms 101—102 adjustably mounted upon suitable supports and carried by these arms are pulleys 103 over which the band 99 also passes. These belt tighteners are adapted to be set to take up the slack in the band.

Thus it will be seen that a continuous rotary motion will be imparted to the egg holder and the egg during the time that it is held within the holder.

The eggs are fed to the holder preferably by means of a chute 104 suitably arranged and suitably supported, and in order to protect the egg while it is moving down the chute 104, the latter is preferably lined with a suitable lining 105 of elastic material.

The end 106 of the material extends beyond the forward end of the chute and is preferably split or cut as at 107 to form yieldable fingers or portions which engage the egg and are adapted to yield so as to deposit the egg upon a delivery element 108. This element is preferably of a drum-like configuration having a series of pockets 109 opening through its periphery into which the eggs are delivered. A cushioning element 110 is provided around the element 108 and extends into the pockets to protect the egg being delivered thereinto. Supported by the chute 104 and projecting beyond the delivery end thereof is a guard or guide 111 which extends around the periphery of the element 108 and is spaced slightly therefrom to coöperate with the element to hold the egg in its seat 109 during the rotation of the element 108 to feed the egg to the carrier. The forward end of the guard 111 is preferably cut away as at 112 to form a recess which is so located that it will not interfere with the transferring of the egg from the element 108 into the cup shaped members 46. The eggs are preferably fed along the chute 104 by gravity and are delivered one at a time to the element 108, which latter is given a continuous rotation by means of a gear 113 connected with the shaft 114 and to which latter the element 108 is secured. The shaft 114 is mounted in suitable bearings and meshing with the gear 113 is a gear 115 which is connected with the shaft 28 for rotation therewith. Thus it will be seen that the intermittent rotation of the shaft 28 will be imparted to the element 108 which latter will operate in unison with the egg carrier. The cut away portion 112 in the guide 111 is provided in order not to interfere with the operation of the egg holding cups, and to permit the latter to approach each other sufficiently to receive the egg from the element 108.

Just as the cups complete one step of intermittent advancing movement, one pair will be in position to receive an egg from the element 108, see particularly Figs. 10 and 11. At this time, a pair of cams 116 which are secured for rotation with the sleeves 91—92, will operate to move the cup shaped members 46 in their bearings 39—39ª for a short distance so as to initially grip the egg by its ends, that is with the ends of the egg projecting through the flexible members 55 in the cups. This movement may be of any desired extent but if moved sufficiently to slightly grip the egg, the parts will function properly. This shifting movement of the cup shaped members may be accomplished in any desired manner through the medium of the cams 116 but the shifting means preferably embodies a slide 117 mounted to move upon a suitable guide 118 secured to a suitable support, preferably the side members 27—28 of the supporting structure. The slide 117 is preferably provided with spaced rollers 119 between which the cam 116 operates, and mounted upon the slide 117 is a roller 120 which is adapted to engage the end of the tubular stem 47 of the cup shaped member, and inasmuch as the cams 116 are given continuous rotary motion by the sleeves 91—92, it will be manifest that the slide 117 will be operated and will move the cup shaped members 46 toward each other. The cams 116 will also operate to retract the slide so that the slides will again be positioned to pass behind the next advancing cups or holders. Inasmuch as the cams 58 operate in the grooves 57 in the stems 47 of the cup members 46 to cause the members to move toward and away from each other to open and close, it will be manifest that provision must be made in order to permit the slide 117 to operate these cup shaped members independently of the cams 58. To that end the cams 58 are provided with what might be termed cut out portions 121, see particularly the diagrammatic view of the cam, Fig. 19. This cut out portion of the cam 58 is positioned adjacent the slides 117 to permit of such an initial movement of the cup shaped members.

After the initial movement of the cup shaped members by the cams 116 and slides 117, the carrier will be given another step in its intermittent advancement, at which time the portion 63 of the cams 58 will be brought into operation to further control the movement of the cup shaped members in the manner as already described.

The operation of the slide 117 will be successive upon the advancing cup shaped members as will be understood. It will be manifest that the shaft 28 having a timed operation, and by the provision of the sleeves rotatable thereupon and which sleeves carry the cams 116 and the driving mechanism for imparting a rotary motion to the eggs with respect to the carrier; the sleeves 91—92 constitute another timed shaft whereby the various parts will operate in timed relation with respect to each other.

The eggs will be delivered to the carrier at the point A as shown in the diagram Fig. 18 and at this point, the initial gripping of the egg will commence to take place, that is to say, the cams 116 will begin to operate the slide 117 just enough to support the egg and raise it from the element and receive it from the element 108, and the holders will remain in such a position until the carrier has advanced to the point B. At this time the cams 58 will begin to operate upon the holders and will move them toward each other in a closing position until the carrier reaches the point C. From the point C to the point D, the carrier will move with the cups 46 in what might be termed their closed position and during the interval of movement from the point C to D the cutting operation of the egg shell is performed. From the point D the cams will operate upon the cup shaped members to move them in a direction to separate the parts of the shell to a small extent until the point E is reached. During the travel of the carrier from the points D to E the albumen will be delivered from the shell as the parts of the shell will not be separated sufficiently to permit the yolk to be discharged. From the point E to the point F, the cup shaped members 46 will remain in this partially separated position with respect to each other so that all of the albumen will be discharged and from the point F to the point G the cams 58 will further separate the cup shaped members to still further open the egg shell and permit the yolk to be delivered from the shell. From the point G until the carrier reaches the point A again, the cup shaped members will remain in full open position. During the movement of the carrier from the point G back to the point A, the cams 69 will be brought into operation to shift the plungers 49 by engaging the ends of the stems 50 to eject the shell from the carrier.

The cutting operation of the egg shell may be performed in any desired or suitable manner but preferably by means of a cutting mechanism embodying an impalement member 122 which is constructed of very thin material having a sharp point directed toward the advancing egg. This impalement member is connected with a rock shaft 123 my means of a suitable fastening device or clip 124 and which rock shaft is in turn journaled in a suitable bearing 125 connected with a support 126 by means of a suitable clip 127. Spaced parallel supporting arms 128—129 are arranged on opposite sides of bearing 125 and project laterally beyond the bearing. These arms 128—129 are connected as at 130 with the rock shaft 123 for rocking movement therewith and the arms are provided at one end with bearings 131—132. Arranged within the bearings is a tubular member 133 which is secured against rotation in the bearings by suitable fastening devices 134. The member 133 projects laterally beyond the arm 129 with its extremity terminating adjacent the extremity of the rock shaft 123. Journaled in the tubular member 133 is a rotatable shaft 135, to one end of which is secured a rotary cutter 136 which latter is adjacent and coöperates with the impalement element 122. The cutter may be secured to the shaft 135 by means of suitable fastening nuts 137. Secured to the other end of the shaft 135 is a pulley 138 which is arranged in alinement with a pulley 139 mounted loosely upon a suitable support, preferably the end of the rock shaft 123 and over these pulleys 138—139 passes a belt 140.

Connected with the pulley 139 to rotate therewith is another pulley 141 over which another endless band 142 passes. This band 142 also passes over a pulley 143 which in turn is connected to rotate with the sleeve 92 that revolves upon the shaft 28.

Thus it will be seen that inasmuch as the sleeve 92 is given a continuous rotation, a continuous rotation will also be imparted to the cutter 136 The arms 128—129 are connected at their other end by means of a suitable connecting bar or member 144 and mounted upon this connecting member 144 is a counterbalancing weight 145 so as to hold the impalement element 122 and the cutter 136 in proper operative position with respect to the advancing egg.

The cutter and impalement device are counterbalanced in order to insure the proper positioning thereof so that as the egg advances by an intermittent movement, and as the point of the impalement device 122 will be maintained in the path of the advancing movement of the egg, the egg during the completion of the intermittent movement, which as before stated, is produced by a Geneva movement, the egg will strike the end of the impalement device with sufficient force, as distinguished from a pressure, to cause the impalement device to penetrate the shell. When the shell is thus penetrated, and as the egg is given a rotary movement about its axis, at the same time the rotary cutter 136 is operating upon the outside of the shell, it will be seen that the shell will be readily cut. The impalement element 122 being counterbalanced, it will prevent the same from glancing off of the egg when the egg strikes the impalement device and this impalement device is also located in a position that it will not penetrate the yolk. As the egg advances, and before the shell is cut, the albumen will maintain the yolk at practically the center of the egg, but as the albumen is being discharged and as the egg shell is rotated, it will be manifest that the yolk will gravitate toward the bottom side of the egg and will also insure against puncture of the yolk.

In order to limit the pivotal or automatically adjusting movement of the cutting device, adjustable stop devices 146—147 may be provided between which the connecting member 144 between the arms 128—129 is adapted to move. These stop devices may be supported by a suitable bracket 148 mounted upon a suitable bracket 149 by means of a suitable fastening device 150, rendering it possible to remove the support 148 when desired.

By the provision of the counterbalanced arm system or arrangement, it will be manifest that the impalement element, together with the cutter proper, will automatically adjust themselves to compensate the varying diameters of the eggs as they approach the cutting mechanism and thereby insure the cutting of each and every egg as it is presented to the cutter.

In Figs. 15 to 17 there is shown another form of cutter embodying the support 125 in which a rock shaft 151 is mounted. This shaft projects beyond the ends of the support or bearing 125, and connected to the ends by means of fastening devices 152 are spaced arms 153—154 which project on opposite sides of the bearing and shaft. These arms may be of any desired length one end of which arms are connected by means of a connecting member 155 secured therebetween in any suitable manner. Mounted upon the connecting member is a counterbalancing weight 156 and the connecting member is adapted to operate between spaced stops 157—158 carried by a support 159 and mounted upon a suitable support 160. These stop devices and mountings are similar to the form shown in Fig. 14 and are provided for the same purpose.

The forward ends of the arm 153—154 are provided with suitable bearings in which is mounted a tubular member 163 which projects beyond the bearings and is secured against rotation therein in any suitable manner. Secured to one end of the tubular member 163 in any suitable manner such as by means of a suitable clamp 165, is an impalement member 166 similar to the impalement member 122 and is provided with a point 167 directed in the path of the advancing movement of the egg. This impalement member is maintained in a fixed relation with respect to the arms 153—154 and the tubular member 163, but its relative position may be varied through the medium of the clamping device 165. Journaled in the tubular member so as to project beyond the ends thereof is a rock shaft 168, one end of which terminates beyond the tubular member but in close proximity to the impalement element 166. Connected with this end of the rock shaft 168 is a cutting device 169 having an active edge 170 which coöperates with a similar active edge 171 of the impalement element 166. These two elements 169—166 will coöperate to form a cutter somewhat in the nature of a pair of shears. The element 169 is secured to the rock shaft 168 by a suitable fastening device 172.

Connected with the other end of the rock shaft 168 is a crank arm 173 which may be adjusted with relation to the rock shaft by means of a suitable clamp 174 through the medium of which it is secured to the shaft. This crank arm 173 may be of any desired length and connected with the free end thereof is a link 175 which in turn is eccentrically connected as at 176 with a gear 177. This gear meshes with a mutilated gear 178 that is in turn connected with the sleeve 91 for continuous rotation therewith. The gear 177 is supported in any suitable manner preferably by having its axle 179 journaled in a suitable bushing 180 carried by the support 27. Thus it will be seen that inasmuch as the sleeve 91 is given a continuous rotation during the operation of the machine, the mutilated gear 178 will also be given a continuous rotation so that its active portion 181 will be brought into operative relation with the gear 177 intermittently, and only at the time when an egg is present at the cutting mechanism and has been penetrated by the impalement element 166. During the time that the teeth 181 of the mutilated gear are rotating the gear 177, the cutting element 169 will, through the medium of the rock shaft 168 be given a reciprocatory movement with respect to the impalement element 166, thereby cutting the egg shell but, when the egg shell has been cut and the cut egg has been advanced, the cutting mechanism will remain idle until another egg is brought into position to be cut thereby.

With both forms of the cutting mechanism, it will be manifest that they are pivotally mounted for free swinging movement within certain limits, that is within the limits of the stop devices and this will tend to maintain the impalement element in proper position to meet the advancing egg and the stops will also prevent the same from dropping down to a point where it would penetrate the yolk.

It is thought that the operation of this device will be clearly understood from the foregoing, but briefly stated it is as follows:

When the machine is started in operation, an intermittent rotation will be imparted to the egg carrier through the medium of the Geneva element 30 and at the same time a continuous rotation will be imparted to the sleeves 91—92 to continuously rotate the egg holding cups with respect to their supports and carriers. At the same time the cams 116 will be continuously rotated and in the form of cutters shown in Figs. 13 and 14 the cutters 136 will be continuous in rotation, but in the form shown in Figs. 15 to 17, the cutting element 169 will be given a reciprocatory movement.

The eggs are fed down the chute 104 upon the element 108 which is also given an intermittent rotation, due to the fact that it is connected to rotate with the shaft 28 through the medium of the gears 115 and 113. Just as the cup shaped members 46 reach the point of delivery of the egg from the element 108 thereto, the cam shaped members 116 operating upon the slides 117 will shift the cup shaped members 46 toward each other slightly or for a sufficient distance to cause the flexible members 56 to engage the ends of the egg to lift the same from the element 108 upon the next advancing movement of the carrier. As the carrier then advances, the cams 58 operate to shift the cup shaped members 46 further toward each other until the egg is gripped to its full extent by the cup shaped members. During this advancing movement from that point, the cutter begins to operate upon the egg, that is to say, the impalement member will penetrate the shell and the cutter operating on the outside the shell will be cut. During the cutting operation or during the entire time that the egg is in the carrier or held by the cup shaped members, it is given a continuous rotation about its own axis so as to facilitate the cutting and also facilitate delivering the contents from the shell. After the cutting operation, the parts of the egg shell in its next portion of advancing movement in the carrier will be slightly separated by the cams 58. This separating movement is sufficient to permit the albumen to be delivered from the egg shell while the yolk is retained therein. After the albumen has been discharged and during the next portion of the advancing movement of the carrier the parts of the egg shell are still further separated to discharge the yolk. This will occur when the cup shaped members are in what might be termed a wide open position, in which position they remain during the next portion of the advancing movement of the carrier. During this latter portion of the advancing movement, the plungers 49 will be operated by their stems 50 moving or operating over their cams 69 and this will eject the shells from the cup shaped members. The albumen, yolk and shells are collected separately as they are discharged from the machine.

After the egg shell has been thus ejected, the carrier will move further forward in the same direction until it approximately reaches the starting point or the point where the egg is first delivered to the carrier. During this latter portion of movement the slides 117 are brought into operation by the cams 116 to initially adjust the cup shaped members 46 to receive and lift another egg from the element 108.

Should it be desired to discharge the contents of the egg in one operation, that is to discharge the yolk and albumen together without separating them as they are delivered from the egg, all that is necessary is to change the cams 58 for the cams 65 as shown in Fig. 20.

The cup shaped members 46 may be provided with one or more openings 46ᵃ in the wall thereof so as to permit the escape of air, which, if confined within the cups by the insertion of the egg, would form a cushion and prevent the proper seating of the egg in the cup. With these openings, it will be manifest that as the egg is inserted into the cup shaped member, the air will escape through the openings 46ª.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A machine of the character described, embodying a carrier for the eggs, means for actuating the carrier to advance the egg, means arranged along the path of movement of the egg in the carrier for cutting the shell, means for opening the shell embodying provisions for separating the parts of the shell to a small extent and for subsequently separating the parts of the shell to a greater extent, and means for finally ejecting the shell.

2. A machine of the character described, embodying a carrier for the eggs, means for actuating the carrier to advance the egg, means arranged along the path of movement of the egg in the carrier for cutting the shell, means for opening the shell embodying provisions for separating the parts of the shell to a small extent and for subsequently separating the parts of the shell to a greater extent, means for separately collecting the albumen and yolks, and means for finally ejecting the shell.

3. A machine of the character described embodying an intermittently operated carrier for the eggs, a cutter arranged along the path of movement of the egg upon the carrier for cutting the shell, means for moving the egg with respect to the carrier during the period of operation of the cutter upon the egg shell, and means for opening the shell embodying provisions for separating the parts of the shell to a small extent and for subsequently separating the parts of the shell to a greater extent.

4. A machine of the character described embodying an intermittently operated carrier for the eggs, a cutter arranged along the path of movement of the egg upon the carrier for cutting the shell, means for moving the egg with respect to the carrier during the period of operation of the cutter upon the egg shell, means for opening the shell embodying provisions for separating the parts of the shell to a small extent and for subsequently separating the parts of the shell to a greater extent, and means for separately discharging from the machine the albumen and yolk as they are separated.

5. A machine of the character described embodying an intermittently operated carrier for the eggs, a cutter arranged along the path of movement of the egg upon the carrier for cutting the shell, means for moving the egg with respect to the carrier during the period of operation of the cutter upon the egg shell, means for opening the shell embodying provisions for separating the parts of the shell to a small extent and for subsequently separating the parts of the shell to a greater extent, and means operatively connecting the parts for operation in synchronism.

6. A machine of the character described embodying an intermittently operated carrier for the eggs, a cutter arranged along the path of movement of the egg upon the carrier for cutting the shell, said cutter embodying coöperating elements, one of said elements impaling the shell and the other element operating upon the outside of the shell, and means for opening the cut shell embodying provisions for separating the parts of the shell to a small extent and for subsequently separating the parts of the shell to a greater extent.

7. A machine of the character described embodying an intermittently operated carrier for the eggs, a cutter arranged along the path of movement of the egg upon the carrier for cutting the shell, said cutter embodying coöperating elements, one of said elements impaling the shell and the other element operating upon the outside of the shell, means for rotating the egg with respect to the carrier during the operation of the cutter upon the shell, and means for separating the albumen and yolk as they are delivered from the shell.

8. A machine of the character described embodying an intermittently operated carrier for the eggs, a cutter arranged along the path of movement of the egg upon the carrier for cutting the shell, said cutter embodying coöperating elements, one of said elements impaling the shell and the other element operating upon the outside of the shell, means for rotating the egg with respect to the carrier during the operation of the cutter upon the shell, and means for separating the albumen and yolk as they are delivered from the shell, the last recited means embodying provisions for separating the parts of the shell to a small extent and for subsequently separating the shell to a greater extent.

9. A machine of the character described embodying a carrier for the eggs, mechanism for actuating the carrier to advance the egg, and means for opening the shell, and embodying provisions for separating the albumen and the yolk as they are delivered from the shell.

10. A machine of the character described embodying a carrier for the eggs, mechanism for actuating the carrier to advance the egg, means for opening the shell, and embodying provisions for separating the albumen and the yolk as they are delivered from the shell, and means for collecting together the different parts of the egg directly they are delivered from the shells.

11. A machine of the character described embodying a carrier for the eggs, means for intermittently actuating the carrier to advance the eggs, means for imparting to the eggs a rotary movement with respect to the carrier and during an interval of rest of the carrier, and means for opening the egg and separating the contents thereof, the last recited means embodying provisions for cutting the egg shell during the period of rotation of the egg with respect to the carrier and provisions for successively separating the parts of the shell to different degrees to separate the contents of the egg as they are discharged from the shell.

12. A machine of the character described embodying a carrier for the eggs, means for intermittently actuating the carrier to advance the eggs, means for imparting to the eggs a rotary movement with respect to the carrier and during an interval of rest of the carrier, and means for opening the egg and separating the contents thereof, the last recited means embodying provisions for cutting the egg shell during the period of rotation of the egg with respect to the carrier, provisions for successively separating the parts of the shell to different degrees to separate the contents of the egg as they are disarate charged from the shell, and means for finally ejecting the shells.

13. A machine of the character described embodying a carrier for the eggs, means for actuating the carrier to advance the egg, means for holding the egg upon the carrier, the last recited means embodying a holder, and a ring of flexible material carried thereby and into which ring the end of the egg is adapted to be inserted to be frictionally held thereby, means for cutting the egg shell, and means for moving the holder whereby the frictional engagement between the said ring and egg shell will separate the egg shell.

14. A machine of the character described embodying a carrier for the eggs, means for actuating the carrier to advance the egg, means for holding the egg upon the carrier, the last recited means embodying a holder and a ring of flexible material carried thereby and into which ring the end of the egg is adapted to be inserted to be frictionally held thereby, means for cutting the egg shell, means for moving the holder whereby the frictional engagement between the said ring and egg shell will separate the egg shell, and means for ejecting the egg shell from the ring and holder.

15. A machine of the character described embodying a carrier for the eggs, means for actuating the carrier to advance the egg, means for holding the egg upon the carrier, the last recited means embodying a holder and a ring of flexible material carried thereby and into which ring the end of the egg is adapted to be inserted to be frictionally held thereby, means for cutting the egg shell, means for moving the holder whereby the frictional engagement between the said ring and egg shell will separate the egg shell, and means carried with the holder for ejecting the egg shell from the ring and holder.

16. A machine of the character described embodying a carrier for the eggs, means for actuating the carrier to advance the egg, means for holding the egg upon the carrier, the last recited means embodying a holder and a ring of flexible material carried thereby and into which ring the end of the egg is adapted to be inserted to be frictionally held thereby, means for cutting the egg shell, means for moving the holder whereby the frictional engagement between the said ring and egg shell will separate the egg shell, and a plunger carried with the holder and operable to eject the egg shell from the ring and holder.

17. A machine of the character described embodying a carrier for the eggs, means for actuating the carrier to advance the egg, means for holding the egg upon the carrier, the last recited means embodying a holder and a ring of flexible material carried thereby and into which ring the end of the egg is adapted to be inserted to be frictionally held thereby, means for cutting the egg shell, means for moving the holder whereby the frictional engagement between the said ring and egg shell will separate the egg shell, a plunger carried with the holder for ejecting the egg shell from the ring and holder, yielding means tending normally to move the plunger in one direction and means for moving the plunger in the opposite direction and against the stress of the said yielding means.

18. An automatically operating machine for opening eggs and separating the contents thereof, said machine embodying a holder for the eggs, said holder embodying a ring of elastic material into which the end of the egg is adapted to be inserted to be frictionally gripped thereby, and a support for the said ring.

19. A machine for opening eggs and separating the contents thereof, said machine embodying a holder for the eggs, said holder embodying a ring of elastic material into which the end of the egg is adapted to be inserted to be frictionally gripped thereby, and a support for the said ring, the diameter of the opening in said ring being of a size to receive only a portion of the end of the egg, whereby the insertion of the egg thereinto will deflect the body of the ring to form an extended gripping surface against the egg shell.

20. An egg holder for egg handling machines embodying a cup like element, and a flexible annular element connected to the cup like element and extending across the open side of the latter, the diameter of the opening in the second recited element being considerably smaller than the diameter of the open side of the first recited element, whereby the flexible element will be deflected into the first recited element by the insertion of the end of an egg into the said annular element.

21. An egg holder for egg handling machines embodying a cup like element, a flexible annular element connected to the cup like element and extending across the open side of the latter, the diameter of the opening in the second recited element being considerably smaller than the diameter of the open side of the first recited element, whereby the flexible element will be deflected into the first recited element by the insertion of the end of an egg into the said annular element, and an ejector carried with the said holder and operable to eject the egg shell from the said annular element and holder.

22. In a machine of the character described an egg clamping and holding means embodying opposed elements between which the ends of the eggs are clamped, said elements being mounted for sliding movement toward and away from each other, means for causing such movements of the elements, each of said elements embodying an annular elastic element to receive the respective ends of the egg whereby the annular elements will be deflected to form extended gripping surfaces against the egg shell when the said opposed elements are in operative relation.

23. In a machine of the character described an egg clamping and holding means embodying opposed elements between which the ends of the egg are clamped, said elements being mounted for sliding movement toward and away from each other, means for causing such movements of the elements, each of said elements embodying an annular elastic element to receive the respective ends of the egg whereby the annular elements will be deflected to form extended gripping surfaces against the egg shell when the said opposed elements are in operative relation, means for cutting the egg shell when thus held, and means for imparting successive degrees of separation to the parts of the egg shell.

24. In a machine of the character described an egg clamping and holding means embodying opposed elements between which the ends of the egg are clamped, said elements being mounted for sliding movement toward and away from each other, means for causing such movements of the elements, each of said elements embodying an annular elastic element to receive the respective ends of the egg whereby the annular elements will be deflected to form extended gripping surfaces against the egg shell when the said opposed elements are in operative relation, means for cutting the egg shell when thus held, means for advancing the holder with the egg therein, and means for imparting successive degrees of separation to the parts of the egg shell and at different points in the advancing movement of the holder and shell.

25. In a machine of the character described an egg clamping and holding means embodying opposed elements between which the ends of the egg are clamped, said elements being mounted for sliding movement toward and away from each other, means for causing such movements of the elements, each of said elements embodying an annular elastic element to receive the respective ends of the egg whereby the annular elements will be deflected to form extended gripping surfaces against the egg shell when the said opposed elements are in operative relation, means for cutting the egg shell when thus held, means for advancing the holder with the egg therein, means for imparting successive degrees of separation to the parts of the egg shell and at predetermined points in the advancing movement of the holder and shell, and means for ejecting the egg shell from the holder after the contents have been delivered from the shell.

26. An automatically operating machine for separating eggs embodying means for opening the egg, means for manipulating the opened egg to separate the albumen and yolk while they are being discharged from the shell, and means for finally discharging the shell.

27. An automatically operating machine for separating eggs embodying means for opening the egg, means for manipulating the opened egg to separate the albumen and yolk while they are being discharged from the shell, means for finally discharging the shell, and means for collecting together the respective ingredients of the eggs as they are discharged from the shells.

28. A machine of the character described embodying means for opening the egg, means for manipulating the opened egg to separate the albumen and yolk while they are being discharged from the shell, and means for collecting together the respective ingredients of the eggs as they are discharged from the shells, the last recited means embodying a pivotally mounted chute positioned to catch the discharge.

29. A machine of the character described embodying means for opening the egg, means for manipulating the opened egg to separate the albumen and yolk while they are being discharged from the shell, and means for collecting together the respective ingredients of the eggs as they are discharged from the shells, the last recited means embodying a pivotally mounted and counter-balanced chute positioned to catch the discharge.

30. In a machine of the character described an egg clamping and holding means embodying opposed elements between which the ends of the egg are clamped, a support for the said means, means for advancing the support, said elements being mounted for sliding movement toward and away from each other, means for causing such movements of the elements, each of said elements embodying an annular elastic element to receive the respective ends of the egg whereby the annular elements will be deflected to form extended gripping surfaces against the egg shell while the opposed elements are in operative relation, means for rotating the said holding means with relation to the support at a predetermined point in its advancement, and means for cutting the egg shell while the egg is being rotated with respect to the said support.

31. A machine of the character described embodying opposed spaced supports rotatable in unison, coöperating clamping means carried by the supports and between which the ends of an egg are clamped, the said clamping means embodying provisions for frictionally gripping the egg, means for intermittently advancing the supports, a cutter for cutting the egg shell, means for separating the cut shell to discharge the contents of the egg, and means for ejecting the shell.

32. A machine of the character described embodying opposed spaced supports rotatable in unison, coöperating clamping means carried by the supports and between which the ends of the egg are clamped, the said clamping means embodying provisions for frictionally gripping the egg, means for intermittently advancing the supports, a cutter arranged along the path of advancement of the egg for cutting the shell, means for rotating the said clamping means with respect to the supports and during the shell cutting operation, and means for separating the parts of the shell to discharge the contents of the egg.

33. A machine of the character described embodying opposed spaced supports rotatable in unison, coöperating clamping means carried by the supports and between which the ends of the egg are clamped, the said clamping means embodying provisions for frictionally gripping the egg, means for intermittently advancing the supports, a cutter arranged along the path of advancement of the egg for cutting the shell, means for rotating the said clamping means with respect to the supports and during the shell cutting operation, means for separating the parts of the shell to discharge the contents of the egg, the last recited means embodying provisions for successively separating the parts of the egg shell to different extents to respectively discharge the albumen and yolk, and means for ejecting the shell from the holder.

34. A machine of the character described embodying opposed spaced supports rotatable in unison, coöperating clamping means carried by the supports and between, which the ends of the egg are clamped, the said clamping means embodying provisions for frictionally gripping the egg, means for intermittently advancing the supports, a cutter arranged along the path of advancement of the egg for cutting the shell, means for rotating the said clamping means with respect to the supports and during the shell cutting operation, means for separating the parts of the shell to discharge the contents of the egg, and a pivotally mounted hopper between the said supports and disposed to catch the discharge from the egg.

35. A machine of the character described embodying opposed spaced supports rotatable in unison, coöperating clamping means carried by the supports and between which the ends of the egg are clamped, the said clamping means embodying provisions for frictionally gripping the egg, means for intermittently advancing the supports, a cutter arranged along the path of advancement of the egg for cutting the shell, means for rotating the said clamping means with respect to the supports and during the shell cutting operation, means for separating the parts of the shell to discharge the contents of the egg, and a pivotally mounted and counterbalanced hopper between the said supports and disposed to catch the discharge from the egg.

36. A machine of the character described embodying spaced opposed rotatable supports, clamping means carried by the supports and between which the ends of the egg are clamped, means for feeding the eggs to the clamping means, means for actuating the supports to advance the egg, means for cutting the egg shell, means operable at a predetermined point in the advancement of the egg shell to dissupport for separating the egg shell to discharge the contents thereof, in separated condition with respect to each other, and means for ejecting the shell.

37. A machine of the character described embodying spaced opposed rotatable supports, clamping means carried by the supports and between which the ends of the egg are clamped, means for feeding the eggs to the clamping means, the last recited means embodying a cushion upon which the egg is delivered to the said feeding means, means for actuating the supports to advance the egg, means for cutting the egg shell, means operable at a predetermined point in the advancement of the support for separating the egg shell to discharge the contents thereof, in separated condition with respect to each other, and means for ejecting the shell.

38. A machine of the character described embodying a traveling carrier, said carrier embodying clamping means between which the ends of the egg are clamped, means for feeding the eggs to the carrier, the last recited means embodying a rotatable support provided with a pocket, and a flexible element secured to the support and projecting into and across the pocket and upon which flexible element the egg rests.

39. A machine of the character described embodying means for automatically opening an egg and separating the contents thereof as they are delivered from the shell, and means for respectively collecting the different ingredients as they are separated, the last recited means embodying delivery outlets, and cut offs individual to the outlets.

40. A machine of the character described embodying means for automatically opening an egg and separating the contents thereof as they are delivered from the shell, means for respectively collecting the different ingredients as they are separated, the last recited means embodying delivery outlets, cut offs individual to the outlets, and means common to the cutoffs for simultaneously controlling them.

41. A machine of the character described embodying means for automatically opening an egg and separating the contents thereof as they are delivered from the shell, means for respectively collecting the different ingredients as they are separated, the last recited means embodying delivery outlets, cut offs individual to the outlets, and additional discharge outlet for the shells, and means for ejecting the shells into the last recited outlet.

42. In a machine for opening eggs, a cutter for the shell, said cutter embodying an impalement element for the shell, a coöperating cutting element operable on the outside of the shell, and means for imparting to one of the elements a movement relative to the other element.

43. In a machine for opening eggs, a cutter for the shell, said cutter embodying an impalement element for the shell, a coöperating cutting element operable on the outside of the shell, and means for actuating said elements relatively one with relation to the other.

44. In a machine for opening eggs, a cutter for the shell, said cutter embodying an impalement element for the shell, a coöperating element operable on the outside of the shell, means for imparting to one of the elements a movement relative to the other element, and provisions whereby said elements will automatically assume a proper operative position with respect to the egg to be cut.

45. In a machine for opening eggs and separating the contents thereof, a cutter for the shell, said cutter embodying an impalement element for the shell, a coöperating cutting element operable on the outside of the shell, means for imparting to one of the elements a movement relative to the other, and means supporting both of said elements for bodily movement in directions toward and away from the egg.

46. In a machine for opening eggs and separating the contents thereof, a cutter for the shell, said cutter embodying an impalement element for the shell, a coöperating cutting element operable on the outside of the shell, means for imparting to one of the elements a movement relative to the other, and counterbalanced means for supporting both of the elements for bodily movement in directions toward and away from the egg.

47. In a machine for opening eggs and separating the contents thereof, a cutter for the shell, said cutter embodying an impalement element for the shell, a coöperating cutting element operable on the outside of the shell, means for imparting to one of the elements a movement relative to the other, means supporting both of said elements for bodily movement in directions toward and away from the egg, and a stop device for limiting the bodily movement of said elements in one direction.

48. In a machine for opening eggs and separating the contents thereof, a cutter for the shell, said cutter embodying an impalement element for the shell, a coöperating cutting element operable on the outside of the shell, means for imparting to one of the elements a movement relative to the other, means for supporting both of said elements for bodily movement in directions toward and away from the egg, and adjustable stop devices for limiting such bodily movements of the said elements.

49. In a machine for opening eggs, a cutter for the shell, said cutter embodying an impalement element for the shell, a coöperating cutting element operable on the outside of the shell, means for imparting to one of the elements a movement relative to the other element, and means for imparting to the cutting mechanism and the egg another and different relative movement one with relation to the other during the cutting operation.

50. In a machine for opening eggs, a cutter for the shell, said cutter embodying an impalement element for the shell, a coöperating cutting element operable on the outside of the shell, means for imparting to one of the elements a movement relative to the other element, and means for imparting an axial rotation to the egg during the cutting operation.

51. In a machine for opening eggs, a cutter for cutting the egg shell by a shearing operation, said cutter embodying an element for initially impaling the egg shell.

52. In a machine for opening eggs, a cutter for cutting the egg shell by a shearing operation, said cutter embodying an element for initially impaling the egg shell, means for supporting the egg and means for rotating the egg with respect to the supporting means during the cutting operation.

53. In a machine for opening eggs, an element for impaling the shell, and a rotary cutting element operable on the outside of the shell and coöperating with the impaling element.

54. In a machince for opening eggs, an element for impaling the shell, a rotary cutting element operable on the outside of the shell and coöperating with the impaling element, and means for rotating the said rotary element.

55. In a machine for opening eggs, an element for impaling the shell, a rotary cutting element operable on the outside of the shell element operable on the outside of the shell and coöperating with the impaling element, and means for automatically positioning the impalement element to compensate the varying diameters of eggs.

56. In a machine for opening eggs, an element for impaling the shell, a coöperating cutting element operable on the outside of the shell, the last recited element being mounted for movement about a pivot, and means for moving the element about its pivot whereby the shell will be cut by a shearing operation.

57. In a machine for opening eggs, an element for impaling the shell, a coöperating cutting element operable on the outside of the shell, the last recited element being mounted for movement about a pivot, and means for moving the element about its pivot whereby the shell will be cut by a shearing operation, the said elements being maintained in a fixed relation.

58. In a machine for opening eggs, an element for impaling the shell, a coöperating cutting element operable on the outside of the shell, the last recited element being mounted for movement about a pivot, means for moving the element about its pivot whereby the shell will be cut by a shearing operation, the said elements being maintained in a fixed relation, and means mounting said elements for simultaneous bodily adjustment.

59. In a machine for opening eggs, a cutter for cutting the shell, said cutter embodying an element for impaling the shell and a rotary cutting element coöperating therewith and operable on the outside of the shell, and means for imparting motion to the said rotary element.

60. In a machine for opening eggs, a cutter for cutting the shell, said cutter embodying an element for impaling the shell and a rotary cutting element coöperating therewith and operable on the outside of the shell, means for imparting motion to the said rotary element, and means whereby the said elements will be simultaneously and automatically positioned to compensate eggs of varying diameters.

61. In a machine for opening eggs, a cutter for cutting the shell, said cutter embodying an element for impaling the shell and a rotary cutting element coöperating therewith and operable on the outside of the shell, means for imparting motion to the said rotary element, and means whereby the said element will be simultaneously and automatically positioned to compensate eggs of varying diameters, the last recited means embodying means for counterbalancing the said cutter.

62. In a machine for opening eggs, a cutter for cutting the shell, said cutter embodying an element for impaling the shell, a coöperating pivotally mounted element operating against the outside of the shell, and means for rocking the last recited element about its pivot.

63. In a machine for opening eggs, a cutter for cutting the shell, said cutter embodying an element for impaling the shell, a coöperating pivotally mounted element operating against the outside of the shell, means for rocking the last recited element about its pivot, and means mounting said elements for simultaneous bodily movement.

64. In a machine for opening eggs, a cutter for cutting the shell, said cutter embodying an element for impaling the shell, a coöperating pivotally mounted element operable against the outside of the shell, and means for imparting a movement to the element about its pivot, the last recited means embodying a gear and like mechanism.

65. In a machine for opening eggs, a cutter for cutting the shell, said cutter embodying an element for impaling the shell, a coöperating pivotally mounted element operable against the outside of the shell, and means for imparting a movement to the element about its pivot, the last recited means embodying a gear and a mutilated gear for driving the former whereby the said pivotally mounted element will be maintained at rest during a predetermined portion of the rotation of the said mutilated gear.

66. In a machine for opening eggs, a cutter, said cutter embodying an element for impaling the shell, a coöperating element mounted for movement about a pivot and operable on the outside of the shell, means for moving said element about its pivot, means mounting said elements for simultaneous bodily movement in directions toward and away from the egg, and means for limiting such bodily movements of the elements.

67. In a machine for opening eggs, a cutter, said cutter embodying an element for impaling the shell, a coöperating element mounted for movement about a pivot and operable on the outside of the shell, means for moving said element about its pivot, means mounting said elements for simultaneous bodily movement in directions toward and away from the egg, and means for limiting such bodily movements of the elements, the last recited means embodying adjustable stop devices whereby the extent of bodily movement of the elements may be varied.

68. A machine for opening eggs embodying a carrier for the eggs, feeding mechanism for the eggs, the said feeding mechanism embodying a rotatable support having a pocket therein for receiving the egg, means for rotating the support to present the egg to the carrier, and means coöperating with the said pocket for holding the egg therein until the egg is presented thereby to the carrier.

69. A machine for opening eggs embodying a carrier for the eggs, feeding mechanism for the eggs, the said feeding mechanism embodying a rotatable support having a pocket therein for receiving the egg, means for rotating the support to present the egg to the carrier, and a guide arranged along the path of movement of the egg in the support and extending across the pocket for holding the egg in the pocket until it is presented to the carrier.

70. A machine for opening eggs embodying a carrier for the eggs, feeding mechanism for the eggs, the said feeding mechanism embodying a rotatable support having a pocket therein for receiving the egg, means for rotating the support to present the egg to the carrier, means coöperating with the said pocket for holding the egg therein until the egg is presented thereby to the carrier, and means for imparting an intermittent movement to the said support.

71. A machine for opening eggs embodying a carrier for the eggs, feeding mechanism for the eggs, the said feeding mechanism embodying a rotatable support having a pocket therein for receiving the egg, means for rotating the support to present the egg to the carrier, means coöperating with the said pocket for holding the egg therein until the egg is presented thereby to the carrier, and means for imparting an intermittent movement to the said support, the last recited means embodying a Geneva movement.

72. A machine of the character described embodying a carrier for the egg, means for cutting the shell and means for automatically separating the parts of the shell to discharge the contents from the egg.

73. A machine of the character described embodying a carrier for the egg, means for cutting the shell embodying a cutter operating with a shearing action, and means for automatically separating the parts of the shell to discharge the contents of the egg therefrom.

74. A machine of the character described embodying a traveling carrier, said carrier embodying clamping means between which the ends of the egg are clamped, means for actuating the clamping means to render the same active and inactive, means for feeding the eggs to the carrier, the last recited means embodying a movable support for receiving the eggs, and additional means for actuating the clamping means in one direction.

75. A machine of the character described embodying a traveling carrier, said carrier embodying clamping means between which the ends of the egg are clamped, means for actuating the clamping means to render the same active and inactive, means for feeding the eggs to the carrier, the last recited means embodying a movable support for receiving the eggs, and means operating upon the said clamping means in advance of the first recited clamp actuating means to initially clamp the egg to remove the egg from the said support.

76. A machine of the character described embodying a traveling carrier, said carrier embodying clamping means between which the ends of the egg are clamped, means for actuating the clamping means to render the same active and inactive, means for feeding the eggs to the carrier and embodying a movable support, a chute for delivering the eggs to the support, and a lining for the chute, the end of the lining projecting beyond the end of the chute, the said projecting end being shaped to form yieldable fingers to frictionally engage the egg.

In testimony whereof I have signed my name to this specification on this 3rd day of May, A. D. 1919.

GEORGE WEISS.